United States Patent Office 3,341,453
Patented Sept. 12, 1967

3,341,453
INHIBITING SALT DEPOSITION
Paul H. Ralston, Bethel Park, Pa., assignor to
Calgon Corporation
No Drawing. Filed June 10, 1964, Ser. No. 374,147
8 Claims. (Cl. 252—8.55)

ABSTRACT OF THE DISCLOSURE

A method is disclosed of treating brine to inhibit the deposition of salt therefrom, in which a small amount of a lead or cadmium containing phosphate is added to the brine.

---

This invention relates to new phosphate glass compositions having controlled solution rates. It relates particularly to certain phosphate glasses containing cadmium and to methods of inhibiting the deposition of sodium chloride from solutions thereof under physical conditions which normally would produce such depositions by adding small amounts of cadmium and/or lead-containing phosphate glasses thereto.

Recovery of oil in certain areas is impeded by the high concentrations of salt in the brine closely associated with the oil. The difficulties arise from the fact that the already saturated or near saturated brines become supersaturated as they pass from their original locations, where they are high in temperature, up through the bore to lower temperatures nearer the surface of the earth. Solid crystallized salt is formed in the brines and carried in suspension as soon as the point of supersaturation is reached, and/or deposits may be formed on the inside of the tubing or other equipment in contact with the brine almost at the same point. The deposits thus formed adhere to the inside of the tubing, pumps, rods, and other metal surfaces, and form constrictions which may extend for many hundreds of feet and which frequently completely close off the flow of the oil-brine mixture or interfere with operation of the pump, etc. The tubing and pump must be periodically pulled from such wells to remove the salt thus deposited.

It is known in the art that the presence of cadmium or lead ion in brines from which salt is crystallizing will retard the formation of the salt crystals, and will alter the physical shape of the crystals when formed. See Booth, A. H., Trans. Faraday Society, 47,633 (1951).

I propose to add cadmium and/or lead ions to oilfield brines to inhibit the formation of salt constrictions in tubes and other equipment.

However, the addition of cadmium or lead ions to oilfield brines in a practical manner is very difficult to achieve since the ions must be dissolved in the brine prior to the point where salt would otherwise be deposited and therefore must be put in solution in the brine at or near the bottom of the well in most cases. Virtually all previously known cadmium and lead compositions capable of generating practical amounts of cadmium and lead ions are too rapidly soluble in brine at the temperatures which normally prevail in oilfield brines prior to their being removed from the well.

I have included cadmium and lead sources in a series of new phosphate glass compositions which exhibit controlled solution rates resulting in the gradual feeding of cadmium and lead ions to the brines over long periods of time. My invention enables the user to charge a quantity of my new phosphate glass to the bottom of the well or a point downhole from an area of salt deposition and, without doing anything further, obtain excellent inhibition of salt deposition for long periods of time. It is not necessary to put new quantities of cadmium or lead-containing composition in the well at frequent intervals as would have been the case with the rapidly soluble crystalline cadmium compounds.

My invention may thus be said to comprise methods and compositions useful for treating brine to inhibit salt deposition therefrom. The series of compositions contemplated comprises glassy or fusion products having the ingredients, expressed analytically, 35.0–50.0 mole percent $P_2O_5$, 5.0–65.0 mole percent CdO, PbO, or mixtures thereof, and 0.0–60.0 mole percent $Na_2O$, CaO, ZnO, MgO, or mixtures thereof. These compositions may be added in various particle sizes to the well at a point below that at which solid sodium chloride formation is likely to take place.

The concentration of cadmium or lead in a brine which is treated according to my invention is dependent primarily upon the composition of the phosphate glass but is also of course affected by the particle size or surface area exposed to the dissolving brine. Other factors affecting solution rate in each particular case may be called environmental factors—they include the concentration of dissolved salts in the brine, the temperature of the brine, the change in temperature to take place in the brine in the course of removal from the lower strata to the surface, and the pH of the brine. Persons skilled in the art may choose a particular particle size and composition to achieve the desired concentrations of cadmium and lead under the conditions present in a particular well. I prefer to use particle sizes of ⅛″ to ½″ although almost all known situations will be adequately served by particle sizes of .02″ to 2″.

I have developed laboratory procedures for evaluating cadmium and lead-containing phosphate glasses from the standpoints of salt inhibition and solution rate.

In the first series of examples presented below, it will be seen that cadmium and lead-containing phosphate glasses are excellent inhibitors of salt deposition. In this series, a brine was prepared which was saturated at 80° C. (27.5 g. sodium chloride/72.5 ml. distilled water). The salt was dissolved in this preparation by boiling the components under a water-cooled condenser. After all salt was dissolved, the cadmium or lead phosphate glass was added and dissolved and the solution was allowed to cool from the boiling point to room temperature, which generally required only about one and one-half hours. The analyses for inhibition were run after 24 hours storage at room temperature. Better inhibition may be obtained with shorter storage periods or less drastic temperature changes. Untreated brine under these conditions begins to show salt deposition in less than thirty minutes. The laboratory conditions described are somewhat more severe than would be encountered in most field applications.

Two techniques were used for measuring the effectiveness of the treatment. One technique involved simply measuring the amount of solid sodium chloride which came out of solution at the end of the test. The other technique involved titrating the chloride concentration in solution after completion of the test. In both cases, the results were compared with corresponding results for untreated brines (0% inhibition) and completely stabilized brines (100% inhibition) which had been run through the same drastic temperature cycle. Results of the solid salt measurement and chloride titration techniques were then averaged, and the final result for each sample is expressed in terms of percent inhibition of salt deposition.

EXAMPLE I

Using the 80° C. saturated brine described above and the test procedure also outlined above, except that readily soluble cadmium and lead salts were used instead of phosphate glasses, it was found that the presence of $Cd^{++}$ ion in concentrations of 5, 10, and 15 parts $Cd^{++}$ ion per million parts of brine by weight resulted in 25%, 77%, and 95% salt deposition inhibition respectively. Concentrations of 5, 10, and 15 parts $Pb^{++}$ ion per million parts by weight of brine resulted in 0%, 7%, and 25% inhibition of salt deposition respectively.

EXAMPLE II

A cadmium tripolyphosphate glass was prepared for this test, consisting analytically of 62.5 mole percent CdO and 37.5 mole percent $P_2O_5$. Using the laboratory procedure outlined above, it was found that 5, 10, and 15 parts $Cd^{++}$ ion per million parts of brine introduced by way of cadmium tripolyphosphate resulted in 27, 90, and 100 percent inhibition of salt deposition respectively after 24 hours storage.

EXAMPLE III

A cadmium metaphosphate glass was prepared analytically consisting of 50 mole percent cadmium oxide and 50 mole percent $P_2O_5$. Following the same laboratory procedure as stated before, 5, 10, and 15 parts $Cd^{++}$ per million parts of brine introduced by the cadmium metaphosphate resulted in 38, 75, and 93 percent inhibition of salt deposition respectively after 24 hours of room temperature.

EXAMPLE IV

A cadmium-lead polyphosphate glass was prepared consisting analytically of 15.5 mole percent CdO, 11.6 mole percent PbO, 19.2 mole percent CaO, 4.8 mole percent ZnO, and 47.0 mole percent $P_2O_5$. A typical oilfiield brine containing 131,500 mg./l. $CaCl_2$, 27,000 mg./l. $MgCl_2$, and 84,000 mg./l. NaCl was obtained. It had a pH of 5.3. Sufficient sodium chloride was added to supersaturate the brine at room temperature, and the previously described procedure was carried out. Five parts per million of the glassy phosphate described above was added to portion of the brine and another was kept as a control. After five hours storage at room temperature, 87% salt inhibition was achieved in the treated brine.

My glassy cadmium and/or lead-containing phosphates may be made by melting together the appropriate metal oxides and phosphorous pentoxide ($P_2O_5$). The metal oxides and/or carbonates, for example, may also be melted together with appropriate phosphate salts and/or phosphoric acids to obtain the desired analytical ratios. In some instances it will be feasible to melt together appropriate phosphate salts by themselves. The melt is rapidly cooled to permit the formation of a hard vitreous composition. Fusion of the compositions within the scope of my invention will take place generally at 1000° C.–1200° C.

My invention contemplates the use of glassy phosphates analytically consisting essentially of (a) about 35.0 to about 50.0 mole percent $P_2O_5$, (b) about 5.0 to about 65.0 mole percent of CdO, PbO, or mixtures thereof, and (c) about 0.0 to about 60.0 mole percent of an oxide selected from the group consisting of $Na_2O$, CaO, ZnO, MgO, and mixtures thereof. By "analytically," I mean that the glassy fusion products may be said to contain empirically only metal oxides and $P_2O_5$, even through the actual ingredients of the melt may have included phosphates or other salts such as carbonates (from which $CO_2$ is emitted) or phosphoric acid, from which water is driven off, etc.

A preferred group of glasses analytically consists essentcally of (a) about 37.5 mole percent to about 50 mole percent $P_2O_5$, (b) about 15.0 mole percent to about 60.5 mole percent CdO, PbO, or mixtures thereof, and (c) about 2.0 to about 47.5 mole percent of CaO, MgO, $Na_2O$, ZnO, or mixtures thereof.

The following table exhibits the solution rates as measured in the laboratory of certain glassy compositions within the scope of the above. Solution rates were obtained under severe conditions (215° F., the boiling point of the brine) in brines comprising 10% NaCl and 5% $CaCl_2$. This brine composition is typical of strong oilfield brines; the temperature is within the range frequently encountered in downhole sites. The solution rate data were obtained by weighing out a known quantity of the glassy composition and dissolving it in a known amount of brine at the stated temperature. Samples were taken at regular intervals and analyzed for phosphate to calculate the percent phosphate dissolved per unit time.

TABLE I.—SOLUTION RATES OF VARIOUS GLASSY PHOSPHATE COMPOSITIONS

[10% NaCl, 5% $CaCl_2$ Brine, 215° F., pH 6-7, ¼-½″ Particle Size]

| Molar Percent | | | | | | | Solution Rate, Wt. Percent/Mo. |
|---|---|---|---|---|---|---|---|
| CdO | PbO | $Na_2O$ | CaO | ZnO | MgO | $P_2O_5$ | |
| 62.5 |  |  |  |  |  | 37.5 | 25 |
| 50.0 |  |  |  |  |  | 50.0 | 55 |
| 34.4 |  |  | 13.5 | 3.7 |  | 48.4 | 19 |
| 27.5 |  |  | 5.0 |  | 27.5 | 40.0 | <1 |
| 17.3 |  | 35.5 |  |  |  | 47.2 | 149 |
| 24.4 | 9.1 |  | 14.3 | 3.9 |  | 48.3 | 10 |
| 15.8 | 11.8 |  | 19.6 | 4.9 |  | 47.9 | 3 |
| 12.7 | 18.65 |  |  |  | 18.65 | 50.0 | 4 |
| 7.9 |  |  | 46.0 |  |  | 46.1 | 23 |
|  | 28.5 |  | 28.5 |  | 5.5 | 37.5 | <1 |
|  | 50.0 |  |  |  |  | 50.0 | 167 |

The solution rates as is known to those skilled in the art are related to the surface area and particle size of the phosphate material. Smaller particle sizes will yield higher solution rates; larger sizes yield lower solution rates for a given weight of material.

Tests run at lower temperatures demonstrate that lower solution rates are obtained than at higher temperatures. The first composition in Table II appears also in Table I where it exhibited a solution rate of 149% per month under the same conditions except for temperature. The significant reduction in solution rate for lower temperatures can be seen in Table II.

TABLE II.—SOLUTION RATES OF GLASSY PHOSPHATE COMPOSITIONS

10% NaCl, 5% $CaCl_2$ Brine, 145° F., pH 6-7, ¼-½″ Particle Size]

| Molar Percent | | | | Solution Rate, Wt. Percent/Mo. |
|---|---|---|---|---|
| CdO | $Na_2O$ | CaO | $P_2O_5$ | |
| 17.3 | 35.5 |  | 47.2 | 21 |
| 17.3 | 23.3 | 11.8 | 47.6 | 12 |

The first composition in Table II has an over-all metal oxide to $P_2O_5$ molar ratio of about 1.12:1 and the second composition in Table II has a metal oxide to $P_2O_5$ molar ratio of about 1.1:1. The series of phosphate glasses having a molar ratio of metal oxide to $P_2O_5$ of about 1.05:1 to about 1.2:1, in which at least about 10 mole percent is cadmium oxide, is preferred for relatively low downhole temperatures, i.e. 100° F.–140° F. The other metal oxides in the glass may be CaO, MgO, ZnO, PbO, $Na_2O$, or mixtures thereof in which $Na_2O$ is present in greater mole percentages than the combination of all other metal oxides except CdO.

A preferred group of glasses within the above class which are particularly useful in downhole temperatures below about 120° F. are those having a metal oxide to $P_2O_5$ ratio of about 1.05:1 to about 1.2:1 in which the metal oxide content consists esentially of about 10 to about 30 mole percent CdO and about 21 to about 41 mole percent $Na_2O$.

For higher downhole temperatures, a group of glasses containing at least about 10 mole percent CaO or MgO is preferred. This group analytically consists essentially of (a) about 35.0 mole percent to about 50 mole percent $P_2O_5$, (b) about 5.0 mole percent to about 55.0 mole percent of an oxide selected from the group consisting of CdO, PbO, and mixtures thereof, (c) about 10 mole percent to about 60.0 mole percent of an oxide selected from the group consisting of CaO and MgO, and (d) up to about 50.0 mole percent of an oxide selected from the group $Na_2O$, ZnO, and mixtures thereof.

The following examples demonstrate the value of my invention in actual field use.

EXAMPLE V

In the Wyoming area where salt deposition had been a problem, 250 pounds of a glass analytically consisting of 15.5 mole percent CdO, 11.6 mole percent PbO, 19.2 mole percent CaO, 4.8 mole percent ZnO, and 47.0 mole percent $P_2O_5$, having an average particle size of ½" to 1½", was placed in a perforated tail pipe below the pump. The pumping well produced about 80 barrels of oil per day and 45 barrels of water per day; bottom hole temperatures were about 250° F. Operations were maintained by regular and expensive additions of dilution water. Produced brine averaged 338,000 mg./l. chloride for two months prior to treatment.

During salt inhibitor treatment over a three month period, soluble chlorides averaged more than 356,000 mg./l. chloride in the produced brine. This increase in soluble chloride is equivalent to about 10.5 lbs. salt/barrel. Moreover, the solid salt produced with the brine had a very small particle size, allowing a greater quantity of salt to be removed in solid form with the produced brine. Reduction in dilution water was observed during the treatment period.

EXAMPLE VI

The same composition as in Example V but having a smaller particle size was used. In this case in the Michigan area, 80 pounds of the phosphate glass was spotted in the annulus above the perforations of the casing and below the perforations of the tubing. Bottom hole temperatures were about 110°–120° F., and fresh water additions had been required about every ten days to keep the well from salting up and choking off production. After treatment with my invention, dilution water was no longer needed and production continued without salt problems for three months.

My invention contemplates the use of about one part to about 50 parts cadmium or lead ion or combinations thereof per million parts brine, added by way of controlled solution rate glassy phosphate compositions, to inhibit the deposition of salt from saturated brine solutions.

I do not intend to be limited by the above examples, which are for illustrative purposes only. My invention may be otherwise embodied and practiced within the scope of the following claims.

I claim:

1. Method of treating brine to inhibit the deposition therefrom of salt under conditions which would render said brine supersaturated comprising adding to said brine prior to subjection to such conditions a small amount of glassy phosphate composition analytically consisting essentially of (a) about 35 to about 50 mole percent $P_2O_5$, (b) about 5.0 to about 65 mole percent of an oxide selected from the group consisting of CdO, PbO, and mixtures thereof, and (c) about 0 to about 60 mole percent of an oxide selected from the group consisting of $Na_2O$, CaO, ZnO, MgO, and mixtures thereof.

2. Method of treating brine to inhibit the deposition therefrom of salt under conditions which would render said brine supersaturated comprising adding to said brine prior to subjecting to such conditions a small amount of a glassy phosphate composition analytically consisting essentially of (a) about 37.5 to about 50 mole percent $P_2O_5$, (b) about 15.0 to about 60.5 mole percent of an oxide selected from the group consisting of CdO, PbO and mixtures thereof, and (c) about 2.0 to about 47.5 mole percent of an oxide selected from the group consisting of $Na_2O$, CaO, ZnO, MgO, and mixtures thereof.

3. Method of treating brine to inhibit the deposition therefrom of salt under conditions which would render said brine supersaturated comprising adding to said brine prior to subjection to such conditions a small amount of a glassy phosphate composition analytically having a molar ratio of metal oxide to $P_2O_5$ of about 1.05:1 to about 1.20:1 in which the metal oxide component consists essentially of at least about 10 mole percent CdO and the balance selected from the group consisting of $Na_2O$, ZnO, CaO, MgO, PbO, and mixtures thereof, wherein the mole percent of $Na_2O$ is at least as great as the total mole percent of ZnO, CaO, MgO, and PbO.

4. Method of treating brine to inhibit the deposition therefrom of salt under conditions which would render said brine supersaturated comprising adding to said brine prior to subjection to such conditions a small amount of a glassy phosphate composition analytically having a molar ratio of metal oxide to $P_2O_5$ of about 1.05:1 to about 1.2:1 in which the metal oxide component consists essentially of (a) about 10 to about 30 mole percent cadmium oxide, and (b) about 21 to about 41 mole percent sodium oxide.

5. Method of treating brine to inhibit the deposition therefrom of salt under conditions which would render said brine supersaturated comprising adding to said brine prior to subjection to such conditions a small amount of a glassy phosphate composition analytically consisting essentially of (a) about 35 to about 50 mole percent $P_2O_5$, (b) about 5 to about 55 mole percent of an oxide selected from the group consisting of CdO, PbO, and mixtures thereof, (c) about 10 to about 60 mole percent of an oxide selected from the group consisting of CaO, MgO, and mixtures thereof, and (d) up to about 50.0 mole percent of an oxide selected from the group consisting of $Na_2O$, ZnO, and mixtures thereof.

6. Method of treating brine to inhibit the deposition therefrom of salt under conditions which would render said brine supersaturated comprising adding to said brine prior to subjection to such conditions a small amount of glassy phosphate composition analytically consisting essentially of cadmium oxide and $P_2O_5$ in a molar ratio of about 1.67:1.

7. Method of treating brine coproduced with oil to inhibit the deposition therefrom of salt onto tubing, pumps, and other equipment comprising adding to said brine, at a point downhole from a site at which salt is likely to be deposited, a small amount of (a) about 35 to about 50 mole percent $P_2O_5$, (b) about 5.0 to about 65 mole percent of an oxide selected from the group consisting of CdO, PbO, and mixtures thereof, and (c) about 0 to about 60 mole percent of an oxide selected from the group consisting of $Na_2O$, CaO, ZnO, MgO, and mixtures thereof.

8. Method of treating oilfield brine coproduced with oil to inhibit the deposition therefrom of salt during a period of receding temperature comprising adding to said brine prior to said period of receding temperature a small amount of a phosphate glass analytically consisting essentially of (a) about 35 to about 50 mole percent $P_2O_5$, (b) about 5.0 to about 65 mole percent of an oxide selected from the group consisting of CdO, PbO, and mixtures thereof, and (c) about 0 to about 60 mole percent of an oxide selected from the group consisting of $Na_2O$, CaO, ZnO, MgO, and mixtures thereof.

References Cited

UNITED STATES PATENTS

| | | | |
|---|---|---|---|
| 3,021,901 | 2/1962 | Earlougher | 252—8.55 X |
| 3,084,055 | 4/1963 | Carpenter et al. | 106—47 X |
| 3,213,017 | 10/1965 | Ralston | 252—8.55 |
| 3,288,217 | 11/1966 | Ralston | 252—8.55 X |

OTHER REFERENCES

Booth: Faraday Society Transactions, vol. 47, 1951, pages 633 to 640.

LEON D. ROSDOL, *Primary Examiner.*

H. B. GUYNN, *Assistant Examiner.*